May 8, 1934.    J. D. PADGITT    1,957,907
HORSE COLLAR
Filed June 1, 1933
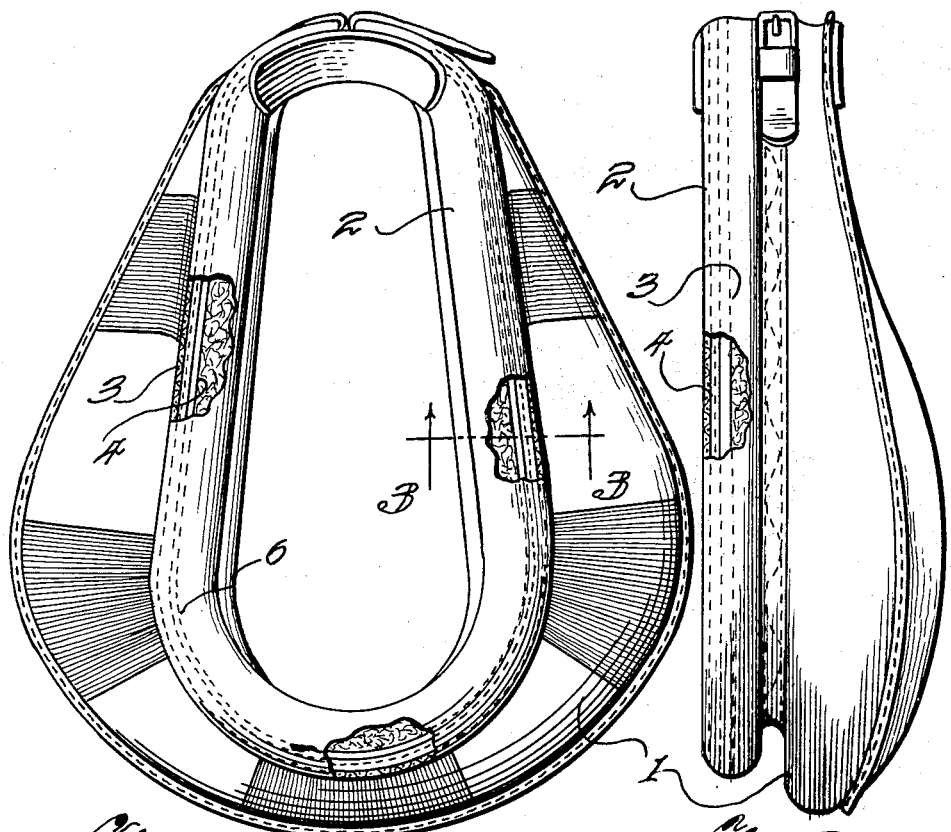
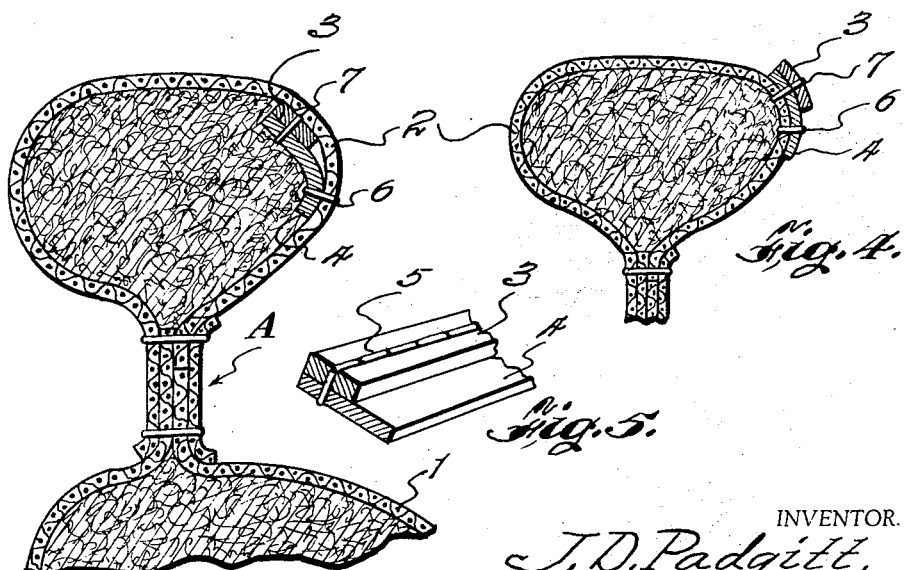
INVENTOR.
J. D. Padgitt,
BY John M. Spellman
ATTORNEY.

Patented May 8, 1934

1,957,907

UNITED STATES PATENT OFFICE 1,957,907

HORSE COLLAR

Jesse D. Padgitt, Dallas, Tex.

Application June 1, 1933, Serial No. 673,875

1 Claim. (Cl. 54—19)

This invention relates to improvements in horse collars and the primary object of the invention is to provide a means for strengthening and re-inforcing the rim of the collar.

Hames were formerly made with a tapering point to go under the round collar rim.

Hames as now made and used run one inch thick to go under the collar rim. In order to accommodate the hame it was necessary to make what is known as a high rim; when made there was not sufficient body to hold the rim in place.

The rim being flexible the hames work out and were, therefore, complained of by the trade. In order to overcome the trouble and meet the requirements a reinforced collar rim with a welt out of leather or other suitable material has been devised and is hereinafter described in detail. This reinforcement forms a shoulder to be used inside or outside of the rim to firmly hold the hame in its place and give a better body to the collar as outlined in the specifications and drawing.

Ordinarily, the rim of a horse collar after wear becomes soft and flabby and does not stand up so as to enable the hames of the harness to be held in correct position, and the present invention provides a re-inforcing means for overcoming this defect. This re-inforcing means consists of placing a leather welt or other suitable material inside or outside of the rim and around the full length of the rim, which forms a firm body and adds to the appearance of the collar.

The invention will be readily understood from a perusal of the following detailed description, taken in connection with the accompanying drawing forming a part of this specification, and in the drawing:

Figure 1 is a front elevational view of a horse collar and embodying the invention, partly broken away for convenience of illustration.

Figure 2 is a side elevational view.

Figure 3 is an enlarged detail sectional and fragmentary view of Figure 1, the view being had on the line 3—3 thereof.

Figure 4 is a view similar to that of Figure 3, but showing the re-inforcing means on the outside of the rim, and Figure 5 represents a partial perspective view of the re-inforcing means.

Having a more detailed reference to the drawing and referring to each part thereof by characters or numerals, 1 denotes the main body of the collar which bears against the shoulders of the animal, and 2 is the rim of the collar which is of substantially elliptical cross-section as shown in the drawing. Between the main body and the rim or at the point A the hames of the harness are placed. In the illustrations the collar is shown constructed of cloth and leather, but the collar may of course be manufactured of either cloth, leather or other suitable material, with any suitable filler or stuffing as shown.

In the drawing, Figure 3, is shown clearly the manner of placing this leather welt inside the rim 2. This welt consists of two strips of leather 3 and 4, joined by a seam at 5. In Figure 1 both strips joined together are shown in position inside the rim of the collar and joined to the rim by a seam at 6.

In a modified form of the placing of the welt or re-inforcing means, and as shown in Figure 4, the strips 3 and 4 are joined to the outer side of the rim, and in this arrangement preferably two seams at 6 and 7 are made, or one seam only may be used.

In both arrangements of the strengthening and reinforcing means (the two strips 3 and 4) a firm shoulder is had which securely holds the hames in place, full length of the rim, and is practicable and durable.

The invention, however, is not to be understood as being limited to the precise means shown for strengthening and re-inforcing the rim, but may be still further altered, to an extent within the limits and meaning of the appended claim.

What is claimed as new is:

A horse collar comprising a body portion, a rim of substantially elliptical cross-section, and a reinforcing member consisting of a strip of leather conforming to the curvature of the surface of the outer rim, a second strip superposed on the first strip and being of narrower width, a row of stitching for holding one edge of the wider strip to the rim and a row of stitching passing through both strips for securing them to the rim.

JESSE D. PADGITT.